UNITED STATES PATENT OFFICE.

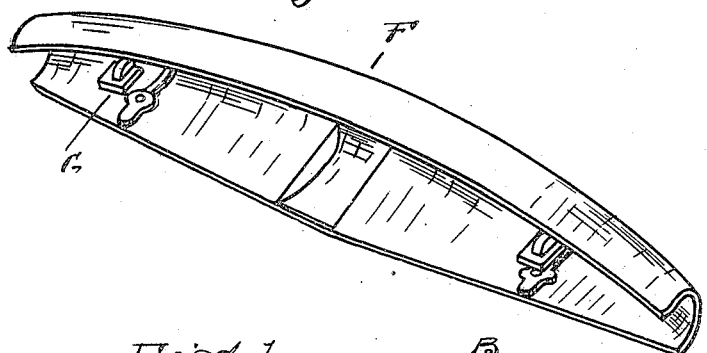
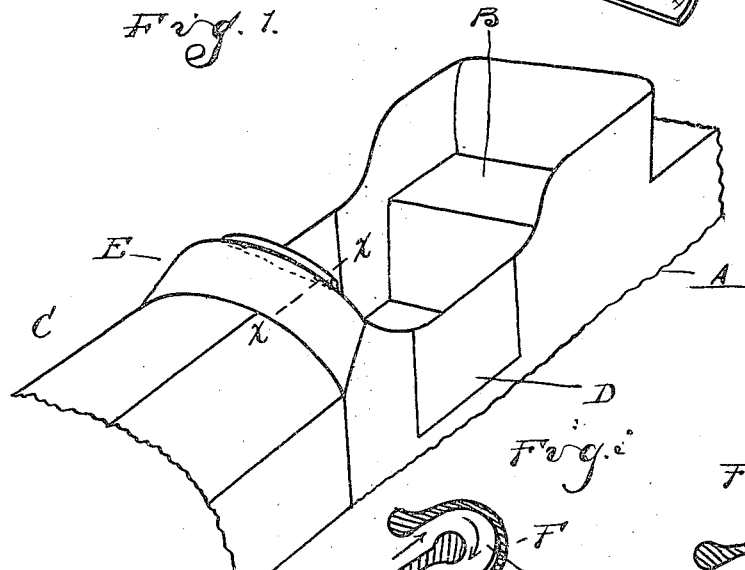
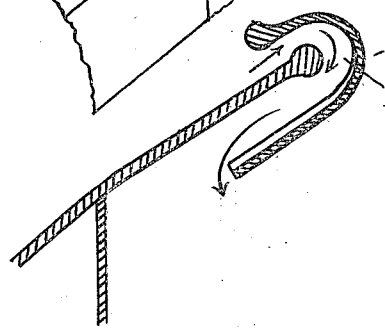
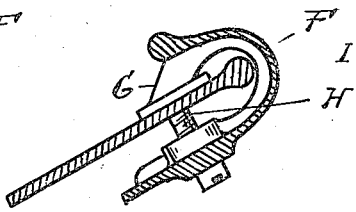

GEORGE W. DUNHAM, OF DETROIT, MICHIGAN, ASSIGNOR TO CHALMERS MOTOR COMPANY, OF DETROIT, MICHIGAN, A CORPORATION OF MICHIGAN.

VENTILATOR.

1,045,776.  Specification of Letters Patent.  Patented Nov. 26, 1912.

Application filed February 10, 1911. Serial No. 607,781.

*To all whom it may concern:*

Be it known that I, GEORGE W. DUNHAM, a citizen of the United States of America, residing at Detroit, in the county of Wayne and State of Michigan, have invented certain new and useful Improvements in Ventilators, of which the following is a specification, reference being had therein to the accompanying drawings.

The invention relates to ventilators for automobile bodies, and consists particularly in the construction of a device for inducing a current of air in the forepart of the automobile body behind the dash-board or hood, as more fully hereinafter described and particularly pointed out in the claims.

In the drawings—Figure 1 is a perspective view of a portion of an automobile body of well-known type, showing my invention applied thereto; Fig. 2 is a perspective view of the deflector; Fig. 3 is a vertical section centrally through the deflector and the dash-hood; and Fig. 4 is a similar section, on line $x$—$x$ of Fig. 1.

At the present time there is a well-known type of automobile body, such as shown in Fig. 1, A being the body proper, B the seat, C the bonnet, D the front doors at the sides, E an inclined hood which extends forwardly from the bonnet C over the dash. In automobile bodies of this kind, having side-doors at the front, the heat radiated from the engine—which is in the bonnet immediately in front of the dash—at times becomes excessive and unpleasant upon the feet of the people occupying the front seat. My device is intended to provide air circulation beneath the hood and in rear of the dash, to overcome this objectionable overheating.

In order to induce this air current by the forward motion of the car, I attach to the upper edge of the hood E a curved deflector F—preferably of U-shape in cross-section, as clearly shown in Fig. 3. This deflector is provided, preferably at the ends, with lugs G on opposite sides, embracing the edge of the hood, and which may be secured thereto by suitable bolts H or by other means. The deflector thus shaped passes around the edge of the hood E a short distance therefrom, so as to form a curved passage I—through which the air, in the motion of the car, will enter and be delivered on the underside of the hood, in the path shown by the arrows.

It will be observed that whenever the car is in motion the air which will be deflected up on the upper side of the hood will pass beneath this deflector and be carried down the swiftly-moving current across the rear of the dash-board and expel the hot air which naturally would accumulate around the feet of the occupants of the front seat.

It is also obvious that this device may be removed by simply taking off the bolts by which it is attached, and thus when it is not desired for use may be quickly dispensed with.

What I claim as my invention is—

1. In an automobile, the combination with the dash-hood, of a curved deflector embracing the upper edge of said hood and spaced therefrom, said deflector having portions extending on both sides of said hood for deflecting the air current induced by the motion of the car from the outer side of said hood to the inner side thereof.

2. The combination in an automobile of the front dash and a deflecting device applied thereto, said deflecting device embracing an edge of said dash and extending on both sides of said dash for deflecting the air induced on one side of the dash by the motion of the car to the opposite side of said dash.

3. The combination in an automobile of a front dash and a curved deflector applied to the upper edge thereof, said deflector having a portion extending above the upper edge of the dash opening toward the front of the automobile, and a portion extending below the upper edge of the dash for deflecting the air by the motion of the car downward adjacent the rear side of the dash.

In testimony whereof I affix my signature in presence of two witnesses.

GEO. W. DUNHAM.

Witnesses:
CARL E. GREGORY,
T. P. CHASE.